United States Patent [19]

Dunford et al.

[11] Patent Number: 5,431,327
[45] Date of Patent: Jul. 11, 1995

[54] SUPERPLASTIC DEFORMATION OF DIFFUSION BONDED ALUMINIUM STRUCTURES

[75] Inventors: David V. Dunford; Peter G. Partridge, both of Farnborough, United Kingdom

[73] Assignee: The Secretary of State for Defence in Her Brittanic Majesty's Government of the United Kingdom of Great Britain and Northern Ireland, London, England

[21] Appl. No.: 170,333

[22] PCT Filed: Jul. 2, 1992

[86] PCT No.: PCT/GB92/01202
§ 371 Date: May 12, 1994
§ 102(e) Date: May 12, 1994

[87] PCT Pub. No.: WO93/01020
PCT Pub. Date: Jan. 21, 1993

[30] Foreign Application Priority Data

Jul. 2, 1991 [GB] United Kingdom ............... 9114258

[51] Int. Cl.6 .................. B21D 26/02; B23K 20/00
[52] U.S. Cl. ..................................... 228/157; 228/190
[58] Field of Search ............. 228/157, 193, 265, 118, 228/190; 148/535, 564; 29/421.1; 72/709

[56] References Cited

U.S. PATENT DOCUMENTS

| | | | |
|---|---|---|---|
| 2,983,993 | 5/1961 | Johnson | 228/157 |
| 4,043,498 | 8/1977 | Conn, Jr. | 228/157 |
| 4,304,821 | 12/1981 | Hayase et al. | 228/157 |
| 4,351,470 | 9/1982 | Swadling et al. | 228/157 |
| 4,530,197 | 7/1985 | Rainville | 228/157 |
| 4,632,296 | 12/1986 | Mansbridge et al. | 228/157 |

FOREIGN PATENT DOCUMENTS 0229954 7/1987 European Pat. Off. .
0350220 1/1990 European Pat. Off. .
2647373 11/1990 France .
962284 7/1964 United Kingdom .

*Primary Examiner*—Samuel M. Heinrich
*Attorney, Agent, or Firm*—Nixon & Vanderhye

[57] ABSTRACT

The low peel strengths of diffusion bonded joints in aluminum alloy structures has been a bar to their use in superplastic forming. The invention overcomes this disadvantage by creating a workpiece intended for subsequent superplastic forming by diffusion bonded assembly of alloy sheets (30–32) in bonding zones according to a predetermined pattern and providing reinforcing material (33) in the workpiece in the region of the diffusion bonded zones. The reinforcing material serves to prevent the tensile stresses exerted during subsequent superplastic forming from initiating peel fracture of the diffusion bonds. Instead, the tensile stresses act so as to bring about superplastic deformation in those regions of the workpiece between the diffusion bonded zones.

7 Claims, 6 Drawing Sheets

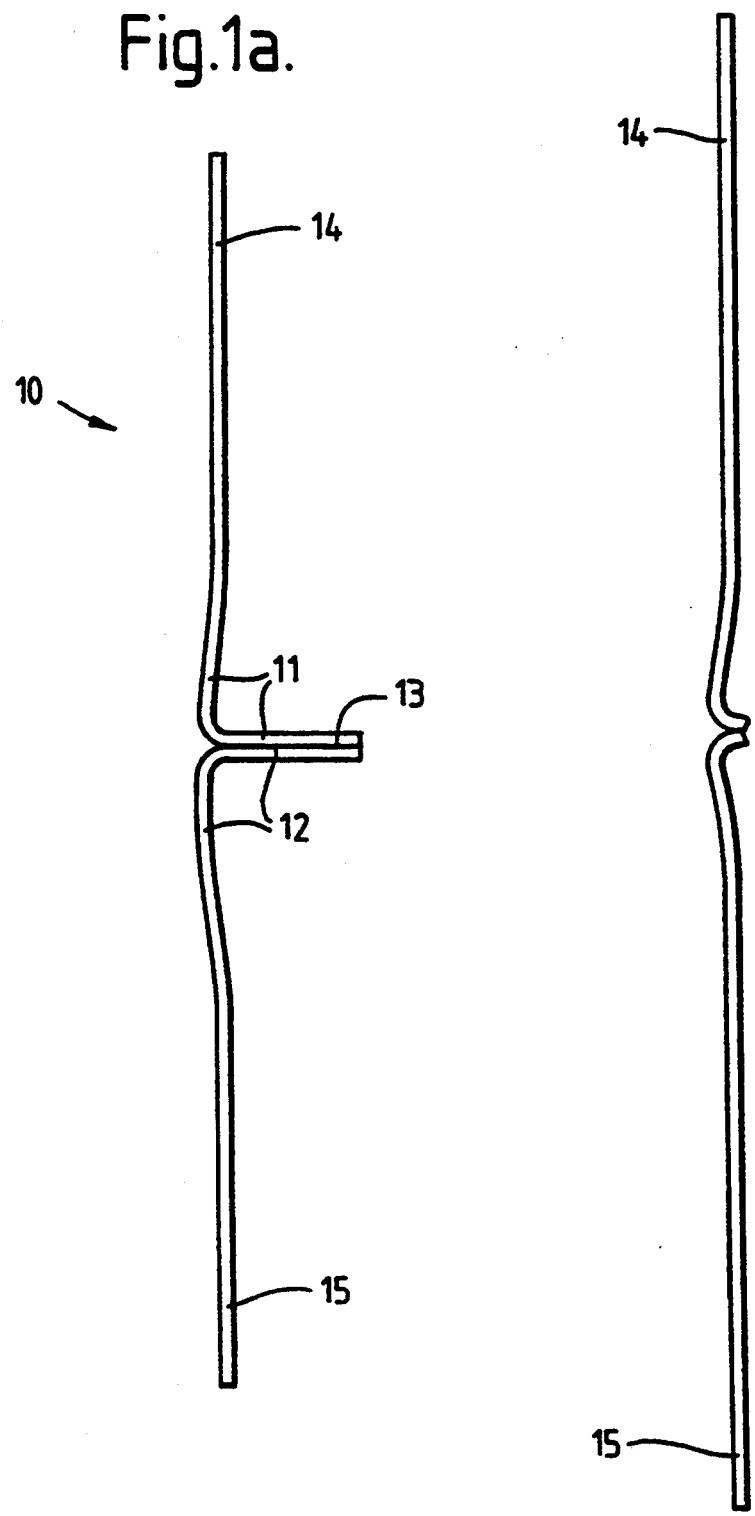

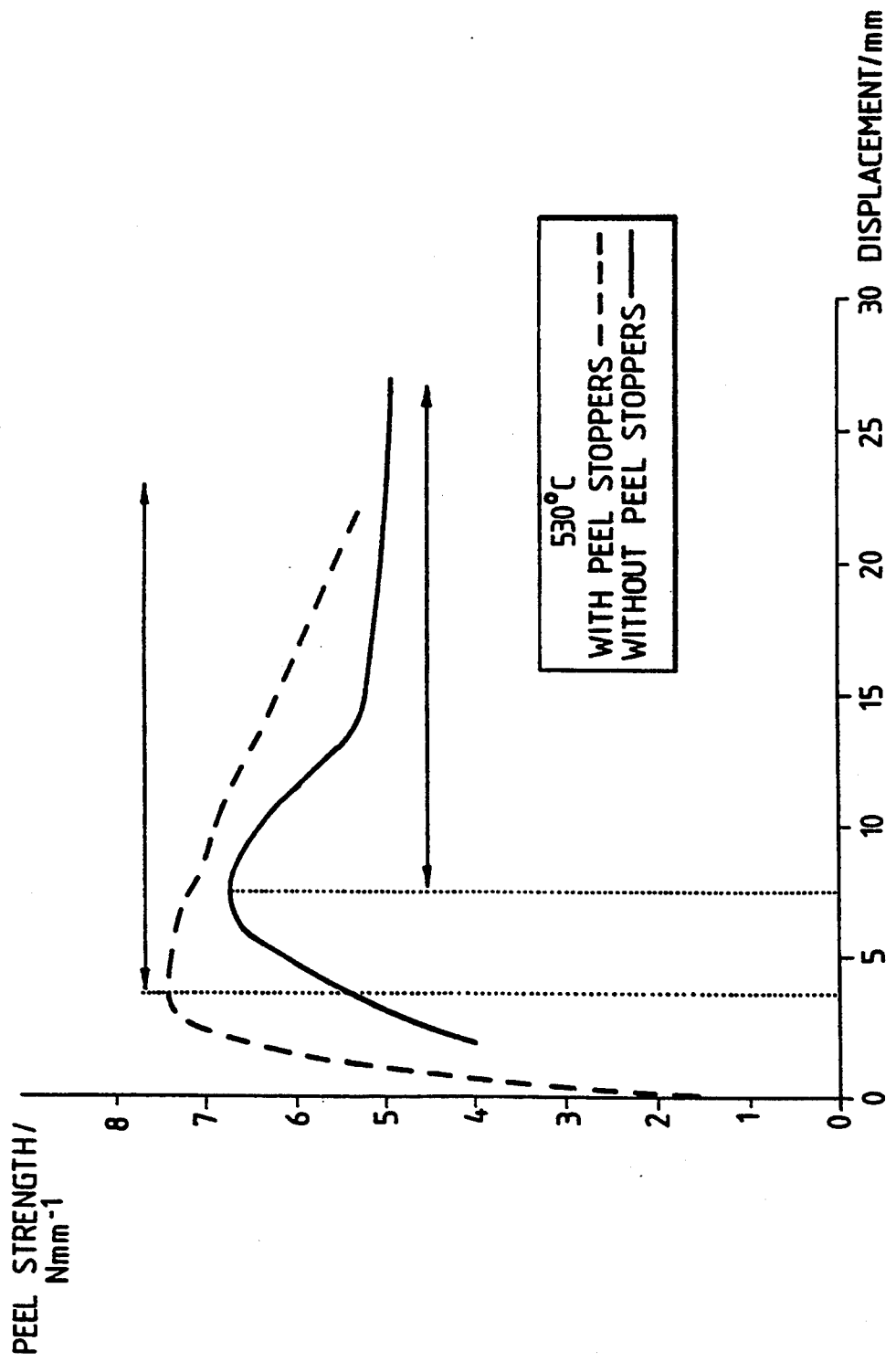

SUPERPLASTIC DEFORMATION OF DIFFUSION BONDED ALUMINIUM STRUCTURES

BACKGROUND OF THE INVENTION

1. Field of the Invention

This invention is concerned with superplastic forming and in particular with an improved method of superplastic forming sandwich structures from a plurality of aluminum alloy sheets.

2. Discussion of Prior Art

The formation of sheet metal into useful configurations is usually achieved by forces applied to the material by hard tooling, such as in press forming. By contrast, in superplastic forming processes, the required deformation of the workpiece is accomplished by application of gas pressure. A die cavity delimits expansion of the workpiece, but intimate contact between the die and the deforming sheet does not occur until the desired configuration has been achieved in the vicinity of the contact zone.

Many aluminum alloys have the potential to undergo superplastic forming and consequently there is a desire amongst aerospace manufacturers to produce aluminum alloy structures using combined diffusion bonding-/superplastic forming processes (DB/SPF) similar to those currently used for titanium components.

However, the propensity of titanium alloys to undergo diffusion bonding is superior to that of the majority of structural aluminum alloys and in many cases strengths of titanium diffusion bonds are comparable to that of the bulk metal. By contrast, the bond interface in joints between aluminum alloys may be much weaker than the parent material. This is especially true at the elevated temperatures required for superplastic forming. As a result of this, when a stress is applied normal to the diffusion bond, the joint is susceptible to peeling under a relatively low peel force.

Low peel strength precludes or limits the use of diffusion bonds in multiple sheet structures with the result that manufacturers are actively seeking alternatives to superplastic forming of aluminum structures lest peel fracture should occur before stresses in the sheet assembly reach the levels required to effect superplastic deformation.

In our earlier patent application GB 2 241 914 A we disclose a method for diffusion bonding aluminum-lithium alloys which gives rise to materials having improved properties compared with previously-known methods. The resultant materials are capable of withstanding high shear stresses, but they have insufficient peel strengths to undergo superplastic forming except in the case of very thin sheet sections of 1 mm thickness or less.

This is in marked contrast to the high peel strengths observed in diffusion bonded titanium alloy joints and it is therefore an object of the present invention to effect an increase in the peel resistance of diffusion bonded aluminum alloys to the extent that such materials are rendered suitable for processing by superplastic forming.

SUMMARY OF THE INVENTION

The invention is a method of superplastically forming a sandwich structure from a plurality of aluminum alloy sheets, the method comprising:

assembling a stack of aluminum alloy sheets in face-to-face relationship, said stack comprising a pair of outer sheets and at least one core sheet;

diffusion bonding the sheets in bonding zones according to a predetermined pattern to create a workpiece having internal cavities;

heating the workpiece to the superplastic forming temperature of the alloy sheets, and applying gas pressure to the cavities to effect superplastic deformation of the workpiece, characterised in that reinforcing material is provided in the stack prior to the diffusion bonding step in the zones where diffusion bonding is to be carried out, said reinforcing material thereby serving to prevent the tensile stresses exerted during subsequent superplastic forming from causing peel fracture of the diffusion bonds such that superplastic strain occurs selectively in those regions of the workpiece between the diffusion bonded zones.

The reinforcing material may take the form of separate pieces such as strips or patches which are bonded in a predetermined pattern on the parent sheets from which the workpiece is to be formed. Conveniently, these separate pieces are diffusion bonded to the parent sheets in the same diffusion bonding operation which joins the sheets together.

Alternatively, the reinforcing material may be integrally formed with the parent sheet material. This is achieved by machining or chemically milling thicker sheets in selected regions to create a predetermined pattern of stepped areas, the raised portions of which are used in diffusion bonding to adjacent sheets.

The optimum thickness and stiffness of the reinforcing material will depend on the superplastic forming conditions used and on the properties of the workpiece. For example, a thicker workpiece will require a stiffer or thicker reinforcement for achieving the same degree of peel resistance.

In order to minimise weight increases resulting from the inclusion of reinforcing material, it is preferable that it should be formed of relatively stiff material whenever possible. Thus, in the cases where the reinforcing material is bonded to plain sheets, as distinct from the cases where it is integrally formed from thicker sheet stock, the reinforcements are advantageously formed from a stiff material such as a metal matrix composite, or of another alloy which is stiffer than the parent sheets, or possibly even a ceramic material. It is particularly advantageous for the stiffness of the reinforcing material to be relatively higher than the stiffness of the parent alloy sheets at the superplastic forming temperature of the latter, i.e. typically in the temperature range 515°–530° C.

Depending on the material from which the reinforcements are made, it may sometimes be necessary to use a liquid phase diffusion bonding technique to achieve effective adhesion of the reinforcing material to the alloy sheets.

Further measures aimed at minimising weight include contouring the reinforcements, for example by providing them with grooves normal or parallel to the edge of the diffusion bond.

BRIEF DESCRIPTION OF THE DRAWINGS

The invention will now be described by way of example with reference to the drawings, in which:

FIG. 1 shows a peel test specimen without reinforcing material before and after testing;

FIG. 3 is a graph comparing the peel performance of test specimens configured as shown in FIGS. 1 and 2;

DETAILED DESCRIPTION OF PREFERRED EMBODIMENTS

Figure 2A:
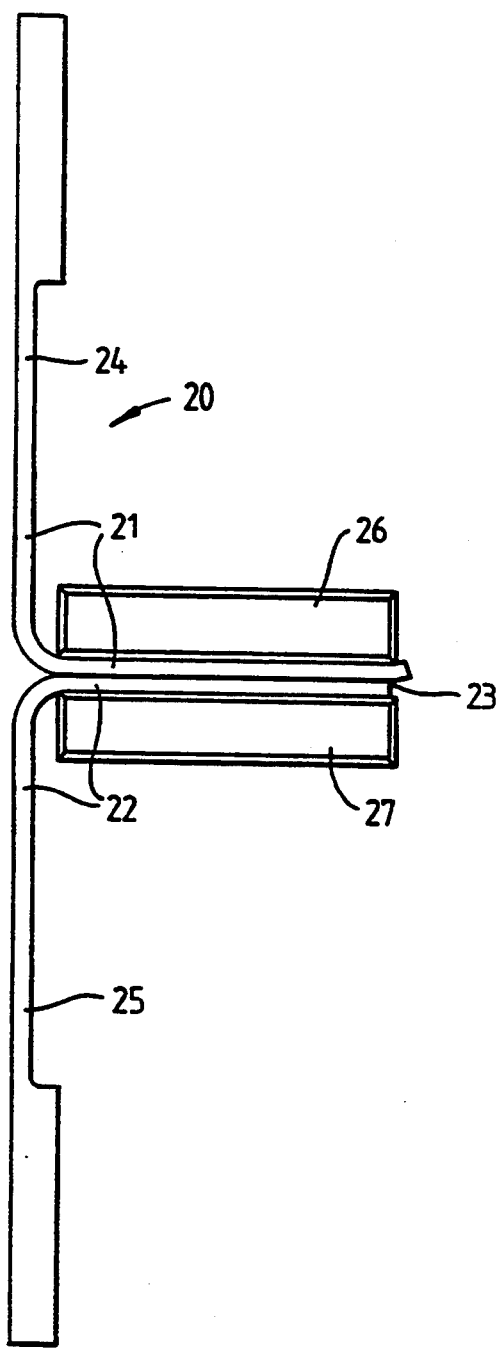
FIG. 2 shows corresponding views of a test specimen provided with reinforcing material.

Referring now to FIGS. 1 and 2, FIG. 1a shows a 90° T peel test piece 10 prior to peel testing. This test piece comprised two strips 11, 12 of 8090 aluminum-lithium alloy (Designation of the Aluminum Association of America) 1.6 mm in thickness bonded together along part of their lengths at 13, with their free ends bent at 90° to form the arms 14, 15 of the "T". The bond 13 was formed by solid state diffusion bonding according to the method disclosed in our earlier patent application GB 2 241 914 A, using a pressure of 0.75 MPa for 4 hours at 560° C.

Elevated temperature peel resistance of the test piece 10 was assessed by applying a tensile load across the arms 14, 15 to effect deformation. This assessment was carried out at 530° C. under a strain rate of $3 \times 10^{-4} s^{-1}$ between the loading points, these being the conditions under which 8090 aluminum-lithium alloy exhibits superplastic behaviour.

FIG. 1b shows test piece 10 after deformation. The bond 13 peeled open under the test conditions by progressive incremental peel fracture and bending of the arms in the diffusion bonded zone 13, without any apparent plastic deformation of the arms 14 and 15.

FIG. 2a shows a modified 1.6 mm sheet test piece 20 machined from 4 mm 8090 aluminum-lithium alloy sheet stock. The full 4 mm thickness was retained at the extremities of the strips 21, 22 to prevent failure of the test piece at the loading pin holes, but otherwise the arms 24, 25 were reduced to 1.6 mm thickness to facilitate direct comparison with the FIG. 1 example, these arms being diffusion bonded to each other at 23. Test piece 20 was further modified by having strips 26, 27 of reinforcing material solid state diffusion bonded to the strips 21, 22 in the region of diffusion bond 23. The reinforcing strips 26, 27 were composed of 5 mm-thick metal matrix composite consisting of 8090 aluminum-lithium alloy containing 20% by weight of silicon carbide particles of average diameter 3 μm.

Figure 2B:
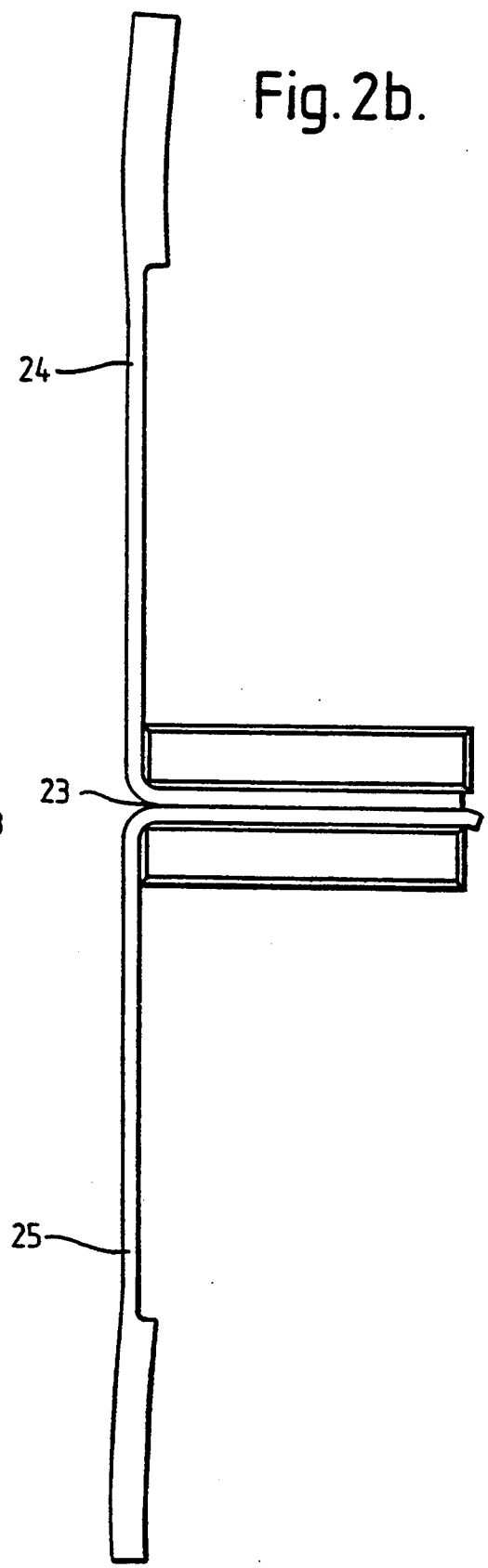

FIG. 2b shows test piece 20 after it was subjected to the same temperature conditions and tensile stresses as test piece 10 above. About 50% superplastic elongation was obtained in the arms 24, 25 without any sign of peel at the bond line 23.

FIG. 3 shows the peel strength v. cross-head displacement curves for the test pieces 10 and 20 at 530° C. The solid curve represents the behaviour of the unmodified test piece 10 and shows a load peak at 6.7 Nmm$^{-1}$ followed by a plateau region. The peak marks the onset of peel in the diffusion bond 13 and the plateau indicates that peel fracture propagates at mope or less constant load.

The performance of modified test piece 20 is represented by the broken line in FIG. 3. Here a load peak at a strength of about 7.6 Nmm$^{-1}$ is reached after relatively little displacement, this peak indicating the onset of superplastic extension of the arms 24, 25. The curve appears to show that this superplastic deformation takes place under decreasing load, but in fact the superplastic flow stress is nominally constant. The downward slope of the curve is caused by the reduction in both width and gauge of the arms 24, 25 as extension takes place.

This improvement in peel strength is also reflected in room temperature performance: After solution heat treatment at 530° C., T peel test pieces similar to test pieces 10 and 20 above were air cooled and aged, then subjected to tensile loading as before. The load peak obtained for the modified test piece with reinforcements was approximately five times greater than that for the unmodified test piece, as indicated below:

| 90° T peel test sample | Peel strength at 20° C. |
| --- | --- |
| Without reinforcing material | 54N mm$^{-1}$ |
| With reinforcing material | 252N mm$^{-1}$ |

Further tests using specimens having 4 mm thick aluminum alloy sheets stiffened with 5 mm thicknesses of metal matrix composite as before produced a peak peel strength of 17.4 Nmm$^{-1}$ prior to the onset of peel fracture.

Whilst the above examples show the efficacy of this technique for solid state diffusion bonded specimens, tests have shown that it is equally applicable to those situations where liquid phase diffusion bonding is employed. The peak and plateau values for peel strength of unstiffened specimens constructed from 1.6 mm thick aluminum alloy sheets which had been diffusion bonded using a 10 μm interlayer of copper by a liquid phase technique such as that described in our earlier patent application GB 2 241 914 A, were 4.4 Nmm$^{-1}$ and 1.9 Nmm$^{-1}$, respectively. These values are too low to sustain a superplastic forming operation without peel fracture. By contrast, liquid phase diffusion bonded specimens which had been reinforced in accordance with the invention were able to undergo superplastic forming quite satisfactorily.

The improvements in peel strength for stiffened liquid phase diffusion bonded articles are such that they may be superplastically formed without fear of peel fracture. At room temperature, peel strengths for stiffened liquid phase diffusion bonded specimens are comparable to their solid state diffusion bonded counterparts.

The behaviour of the test pieces modified with reinforcing material indicates the potential for suitably adapted workpieces to undergo superplastic forming without the risk of joint peel compromising the strength of finished components.

FIGS. 4 to 8 show the method of the present invention applied to a truss core sandwich of aluminum alloy sheets. This type of structure has been commonly formed from titanium alloys by superplastic forming-/diffusion bonding techniques, but the peel stresses encountered during the superplastic deformation stage have hitherto precluded the manufacture of such articles from diffusion bonded aluminum alloys.

Figure 4:
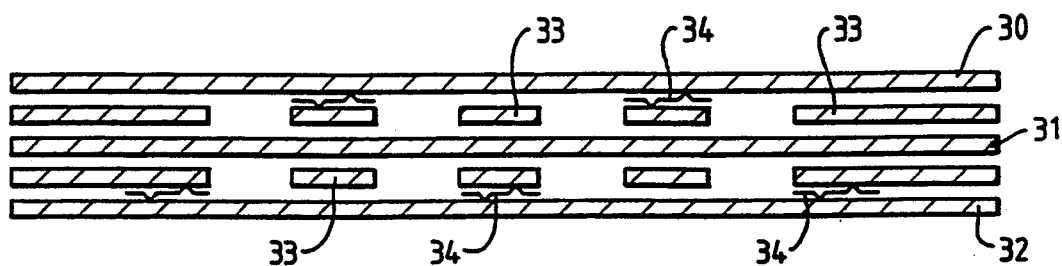
FIG. 4 is a cross-sectional view of an assembly of alloy sheets with separate reinforcing material prior to diffusion bonding.

In FIG. 4 there is shown a three-layer arrangement of aluminum-lithium alloy sheets 30, 31 and 32 with intermediate strips 33 of reinforcing material placed between the outer skin sheets 30, 32 and the core sheet 31. The strips 33 are formed of a stiff material, such as a metal matrix composite of aluminum-lithium alloy reinforced with particulate silicon carbide, or of another stiffer alloy, or of a ceramic material. Barrier coatings 34 are applied where necessary to prevent diffusion bonding in undesired areas.

Figure 5:
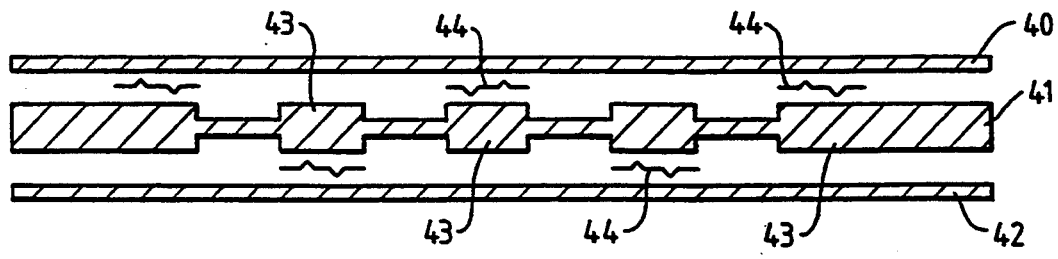
FIG. 5 is a cross-sectional view of an assembly of alloy sheets having integral reinforcing material prior to diffusion bonding.

FIG. 5 shows an alternative arrangement in which the outer skin sheets 40, 42 overlie a contoured core sheet 41 having integral reinforcements 43. The contoured core sheet 41 is made from a thicker sheet which is selectively machined or chemically milled to leave the desired pattern of stepped portions which form the reinforcements 43. Barrier coatings aluminum 44 are used as before in the FIG. 4 example.

Figure 6:
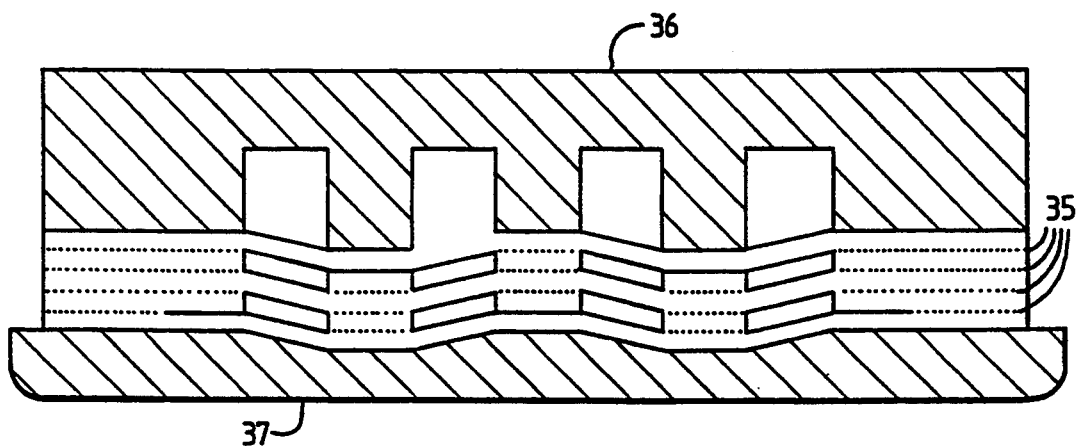
FIG. 6 shows the sheet assembly of FIG. 4 after diffusion bonding.

To effect diffusion bonding between the respective layers, the components are pressed together as shown in FIG. 6 under appropriate temperature and pressure conditions. For 8090 aluminum-lithium alloy this typically involves initial pressing at 120 MPa as the temperature of the bonding pieces is raised to 250° C., followed by a spell at 7 MPa pressure whilst the temperature climbs to 500° C. and finally pressing at 0.75 MPa for a period of at least 1 hour at a temperature between 500° and 580° C. Although viewed in cross-section, the workpiece is shown here without hatched lines in order that the diffusion bonded areas depicted by dotted lines 35 can be more clearly seen.

The dies 36, 37 may be contoured as shown to produce a profiled workpiece having kinked faces over the diffusion bonded regions which are to be superplastically formed. This profiling is an optional measure which reduces the gas pressure required to initiate deformation when the workpiece is subsequently presented to a further die for superplastic forming.

Figure 7:
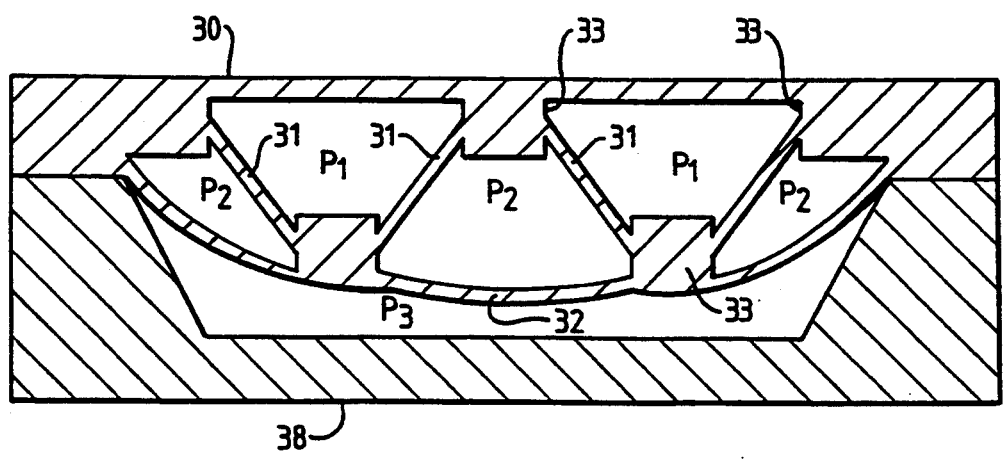
FIG. 7 shows the diffusion bonded sheet assembly of FIG. 6 during superplastic forming.

The workpiece is heated to a temperature of 515°–530° C. suitable for superplastic forming and then gas pressure is applied to the cavities $P_1 1$, $P_2$ and $P_3$ in FIG. 7 to form the workpiece into shaped die 38. An upper die member (not shown) maintains the sheet 30 in flat form whilst the sheets 31 and (to a lesser extent) 32 undergo deformation. The increased resistance to peel due to reinforcing strips 33 concentrates the tensile stresses in core sheet 31 whilst inhibiting the effect of tensile peel stress components acting normal to the bond interfaces. This effectively means that superplastic strain is experienced in the core sheet without causing peel fracture at the bonded joints.

Figure 8:
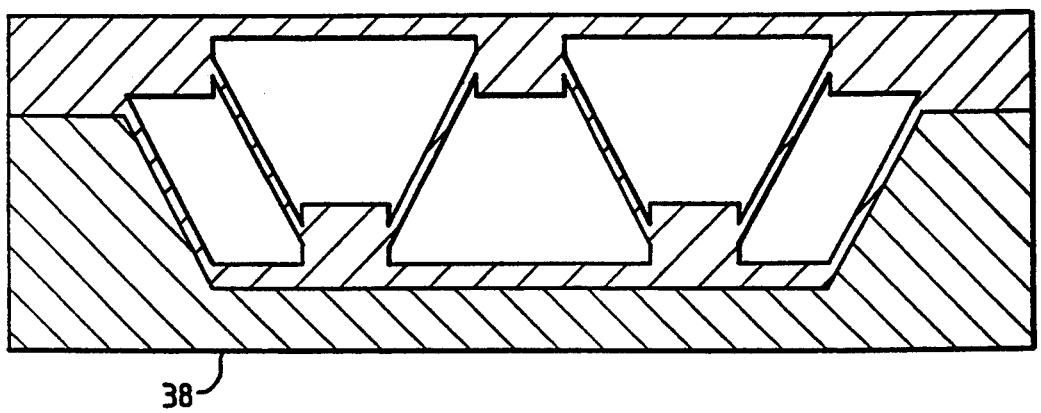
FIG. 8 shows completion of the superplastic forming operation.
Figure 9:
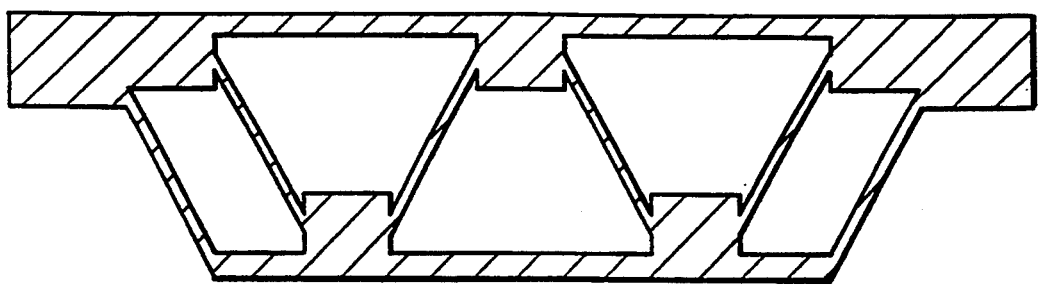
FIG. 9 shows a finished truss sandwich.

FIG. 8 shows the truss core sandwich at the end of the superplastic forming operation, with outer layer 32 pressed firmly into the corners of shaped die 38. FIG. 9 shows the finished component after removal from the die.

It should be noted here that the 90° T peel tests discussed above in relation to FIGS. 1 to 3 illustrate the worst possible case. In general, structures made by superplastic forming techniques will be similar to the truss core sandwich shown in FIG. 9, where the core is inclined to the bond plane at an angle $\phi$ which is less than 90°. This means that the tensile force which must be exerted by the core sheet to initiate peel in the truss sandwich is greater than that required in the 90° case:

Peel force = Tensile force × sin $\phi$

This is true for both room temperature and elevated temperature situations.

Various modifications may be made to reduce the weight of finished products. As indicated above, the reinforcing material may be formed with grooves extending normal or parallel to the edge of the diffusion bonded areas. Alternatively, or possibly in combination with such profiling, selected reinforcing strips 33 in FIG. 4 can be omitted where their adhesion to the outer sheets 30 and 32 is prevented by barrier coatings 34. In the FIG. 5 embodiment, this selective omission would be effected by removing those stepped portions 43 which have overlying barrier coatings 44.

The production of titanium alloy sheet structures by superplastic forming/diffusion bonding has led to substantial reductions in manufacturing costs, not only because of the decrease in the number of operations and tooling jigs required, but also because it enables several components to be made simultaneously. Significant weight reductions are also achievable through the avoidance of rivets or similar fasteners. This has the added benefit of avoiding the stress concentrations which are associated with such fasteners, and also of minimising corrosion effects.

The present invention enables these advantages to be extended to diffusion bonded materials which were hitherto susceptible to peel fracture during superplastic forming, most especially to diffusion bonded aluminum alloy structures. Examples of the types of components which may be formed using this method of DB/SPF processing include inspection covers and doors for pressure cabins. These are structures which are exposed to considerable stresses in use, so their reliability in service must be beyond question. This reliability is assured by the provision of reinforcing material in accordance with the invention as defined by the following claims.

We claim:

1. A method of superplastically forming a sandwich structure from a plurality of aluminum alloy sheets, the method comprising:
   assembling a stack of aluminum alloy sheets in face-to-face relationship, said stack comprising a pair of outer sheets and at least one core sheet;
   providing reinforcing material in the stack in the zones where diffusion bonding is to be carried out,
   diffusion bonding the sheets in bonding zones according to a predetermined pattern to create a workpiece having internal cavities;
   heating the workpiece to the superplastic forming temperature of the alloy sheets, and
   applying gas pressure to the cavities to the effect superplastic deformation of the workpiece,
   said reinforcing material thereby serving to prevent tensile stresses exerted during subsequent superplastic forming from causing peel fracture of the diffusion bonds such that superplastic strain occurs selectively in those regions of the workpiece between the diffusion bonded zones.

2. A method as claimed in claim 1, wherein the reinforcing material is integrally formed with the parent sheet material, this being achieved by a process of selectively removing material from the or each face of at least one of the sheets to create a predetermined pattern of raised portions and recessed portions, the raised portions being used for diffusion bonding to adjacent sheets.

3. A method as claimed in claim 1, wherein the reinforcing material comprises separate pieces such as strips or patches bonded to the parent sheet material in a predetermined pattern.

4. A method as claimed in claim 3, wherein the reinforcing material is diffusion bonded to the parent sheet material in the same diffusion bonding operation which joins the sheets together.

5. A method of superplastically forming a sandwich structure from a plurality of aluminum alloy sheets, the method comprising:.
  assembling a stack of aluminum alloy sheets in face-to-face relationship, said stack comprising a pair of outer sheets and at least one core sheet;
  diffusion bonding the sheets in bonding zones according to a predetermined pattern to create a workpiece having internal cavities;
  heating the workpiece to the superplastic forming temperature of the alloy sheets, and
  applying gas pressure to the cavities to the effect superplastic deformation of the workpiece,
  characterised in that reinforcing material is provided in the stack prior to the diffusion bonding step in the zones where diffusion bonding is to be carried out, said reinforcing material thereby serving to prevent tensile stresses exerted during subsequent superplastic forming from causing peel fracture of the diffusion bonds such that superplastic strain occurs selectively in those regions of the workpiece between the diffusion bonded zones, further characterised in that the reinforcing material comprises separate pieces such as strips or patches bonded to the parent sheet material in a predetermined pattern, and further characterised in that the reinforcing material has a relatively higher stiffness than the parent sheet material at the superplastic forming temperature of the latter.

6. A method as claimed in claim 5, further characterised in that the reinforcing material is selected from the group comprising: a metal matrix composite material; an alloy, or a ceramic material.

7. A method of superplastically forming a sandwich structure from a plurality of aluminum alloy sheets, the method comprising:
  assembling a stack of aluminum alloy sheets in face-to-face relationship, said stack comprising a pair of outer sheets and at least one core sheet;
  diffusion bonding the sheets in bonding zones according to a predetermined pattern to create a workpiece having internal cavities;
  heating the workpiece to the superplastic forming temperature of the alloy sheets, and
  applying gas pressure to the cavities to the effect superplastic deformation of the workpiece,
  characterised in that reinforcing material is provided in the stack prior to the diffusion bonding step in the zones where diffusion bonding is to be carried out, said reinforcing material thereby serving to prevent tensile stresses exerted during subsequent superplastic forming from causing peel fracture of the diffusion bonds such that superplastic strain occurs selectively in those regions of the workpiece between the diffusion bonded zones, further characterised in that the reinforcing material comprises separate pieces such as strips or patches bonded to the parent sheet material in a predetermined pattern, wherein the parent sheet material is formed of an aluminum-lithium alloy and the reinforcing material is formed of a metal matrix composite comprising a particulate reinforcement of silicon carbide in a matrix of aluminum-lithium alloy.

* * * * *